Feb. 9, 1960     L. D. NINNEMAN     2,923,973
SAFETY DEVICE FOR PRESSES
Filed July 16, 1956
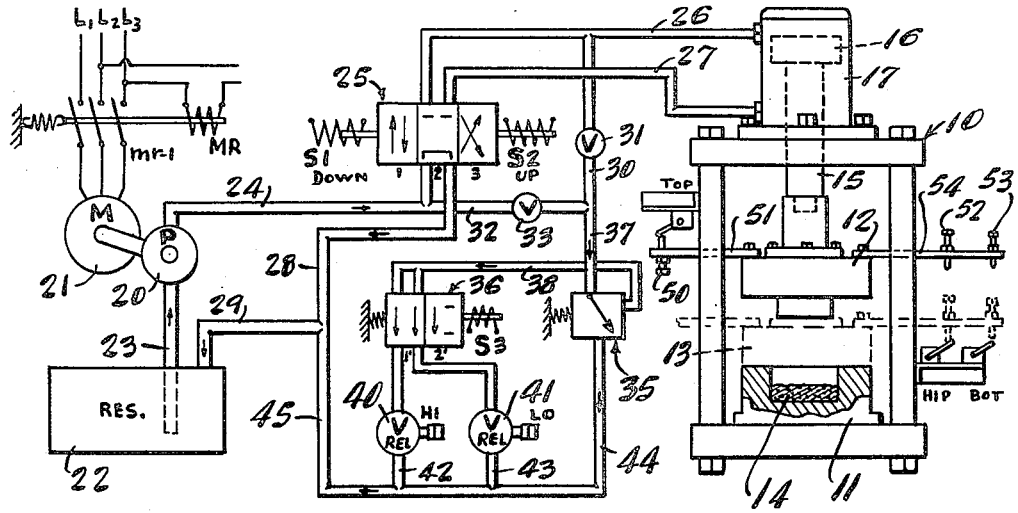
FIG-1-
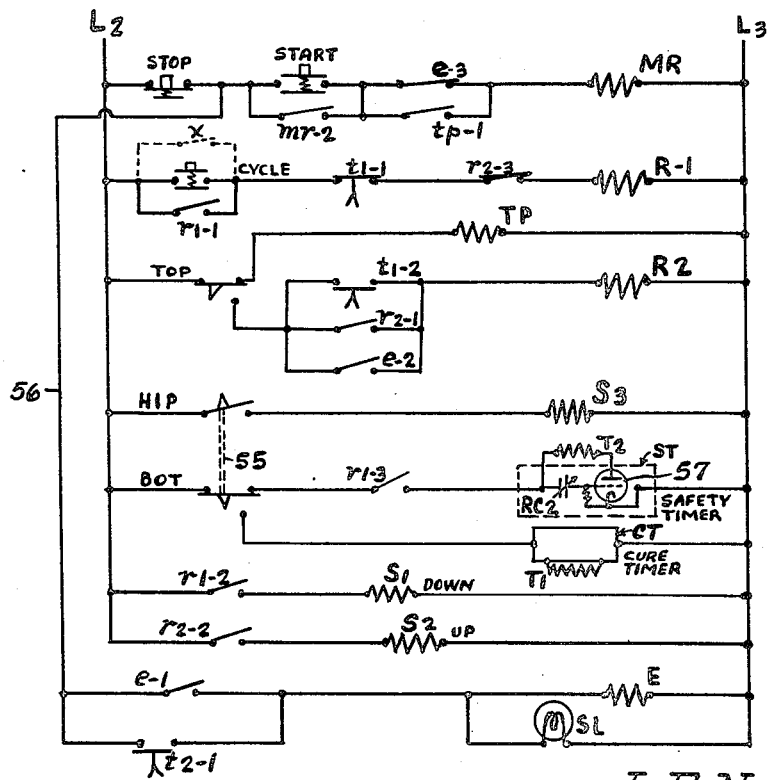
FIG-2-
INVENTOR:
*L. D. NINNEMAN.*
BY
*Hugh A. Kirk*
ATTORNEY United States Patent Office 2,923,973
Patented Feb. 9, 1960

2,923,973

SAFETY DEVICE FOR PRESSES

Lawrence D. Ninneman, Toledo, Ohio, assignor to Baker Brothers, Inc., Toledo, Ohio, a corporation of California Application July 16, 1956, Serial No. 598,136

16 Claims. (Cl. 18—16)

This invention relates to a safety device for presses. More particularly, it deals with a device for timing the rate of closing of a machine or a press from the time that it starts to close until it reaches a position that is safe for continuing its closing or for performing its pressing operation, so that if the initial closing is retarded due to an obstruction, the press will automatically re-open and prevent breaking of the part causing the obstruction or the press, or both.

It is an object of this invention to produce an efficient, effective, simple and economic safety device to prevent damage to machines as well as undesirable objects which may accidentally obstruct the closing of presses.

Another object is to provide a safety device for a machine which, upon being retarded in its operation due to an undesired obstruction, will automatically re-open and then stop and signal there is trouble, all before any damage can occur.

Another object is to provide a safety device for continuous automatic plastic molding presses whereby they will not have to be continuously watched for obstructions or overcharging of the molds which otherwise would cause damage to the press and/or to its molds.

Another object is to provide a means for timing the rate of closing of a press until it reaches a safe position for the application of high pressure for carrying out the pressing operation.

Another object is to provide an automatic means for re-opening a press if the time is too long for its closing due to an obstruction in its path before the high pressure is applied to the press.

Another object is to provide a safety device for a machine which prevents the machine from continuing its operation after the safety device has been operated until the safety device is manually released at the machine.

Generally speaking, this invention involves a machine having a part moving between an open and at least a near closed position, such as the platen or die in a molding press, and means, such as a hydraulic piston and its control system, for moving the part between said open and closed positions. The moving part may be moved mechanically, hydraulically, and/or electrically, including the employment of solenoid operated hydraulic valves. The safety device of this invention includes a limit switch at each of said positions operated by the movement of said part into said positions, and a timer, such as an electronic timer circuit, which is controlled by the movement of said part/or said limit switches to time the rate at which the part normally passes unobstructedly between said positions, particularly in closing. If this time is too long, then the timer operates to control the means for moving the part, by immediately reversing its closing movement. This occurs when an obstruction of any kind is contacted between said positions by the moving part to delay its normal time of closing gauged by the timer. Thus, when the movable part of the machine leaves its open position, the timer is automatically started, and if the timer completes its operation before the moving part reaches the limit switch at the near closed position, the timer will cause the moving part to move back to its open position. The safety device also may include emergency means for both signalling trouble and for preventing the continued operation of the machine until it is manually released at the machine itself.

The safety device of this invention is particularly applicable for electrically controlled hydraulic plastic presses, the closing of which presses is carried out under low fluid pressure by means of by-pass and pressure regulating valves, while the actual pressing operation from the near closed position to its fully closed position is carried out under high fluid pressure, since these changes in fluid pressure may be controlled electrically by the same limit switches that govern the timer of the safety device.

The above mentioned and other features and objects of this invention and the manner of attaining them are given more specific disclosure in the following description of embodiments of the invention taken in conjunction with the accompanying drawing, wherein:

Fig. 1 is a schematic hydraulic flow diagram of a system for controlling the operation of a hydraulic plastic press to which the safety device of this invention may be applied; and Fig. 2 is a schematic wiring diagram of an electrical circuit for controlling the solenoid valves of the system in Fig. 1 including the safety device of this invention.

*I. Hydraulic system*

Referring to Fig. 1, the hydraulic plastic press 10 is shown to have a lower stationary part, die or mold 11 and an upper movable part, die, platen, or mold 12 movable between its full line position shown downwardly through its dotted line position 13 to its fully closed position in contact with the mold 11 for molding a plastic material 14 located therein. The movable part, or upper die or platen 12 is shown directly connected to the end of a vertically reciprocating piston rod 15 of a piston 16 in a hydraulic cylinder 17 mounted on the top of the press 10.

The hydraulic system for controlling the movement of the platen 12 by reciprocation of the piston 16 in hydraulic cylinder 17, comprises a pump 20 for applying pressure to a circulating hydraulic fluid, which pump may be operated by a power source such as electric motor 21 connected to a three-phase electric power line L1, L2 and L3 through the contacts mr–1 of a relay MR connected between two of the power lines or conductors L2 and L3, as will be described later with the electrical control circuit in Fig. 2. The pump 20 may obtain its supply of hydraulic fluid from a reservoir 22 through a duct 23 and from thence applies the hydraulic fluid or liquid under pressure through a duct 24 to a reversing valve 25 controlled by a "down" solenoid S1 and "up" solenoid S2, and thence to and from the cylinder 17 via ducts 26 and 27. The return duct from the cylinder 17 is connected from the valve 25 to ducts 28 and 29 back to the reservoir 22, completing the main power flow circuit through the system for operating the press 10.

In the operation of presses of this type it is not necessary that the full pressure is applied throughout the full stroke of the movement of the platen 12. Accordingly there may be provided either only on the down stroke through by-pass 30 and valve 31 (valve 33 being closed) or on both the up and the down stroke through by-pass duct 32 and valve 33 (valve 31 being closed), a dual pressure regulating main by-pass valve 35. This valve 35 may be hydraulically controlled through a high and a low further by-pass pressure regulating valve 36 controlled by a solenoid S3 and connected to valve 35 through duct 38 to regulate the amount of by-pass through the valve 35, or back pressure created therein to control the pressure applied from duct 24 or 26 to the cylinder 17. One, and the shown position of regulating valve 36 connects through both the high and low pressure relief valves 40 and 41, respectively, in parallel in ducts 42 and 43, so that the low pressure relief valve 41 controls the operation of the main pressure regulating valve 35 by by-passing most of the pressurized fluid from the pump 20 and duct 24 through the by-pass reservoir return duct 44 and 45 to join the duct 29 to the reservoir 22. However, when the high pressure is to be applied to the piston 16, the control valve 36 is operated by the solenoid S3 to cause the by-passing regulating fluid from valve 35 to pass only through the high pressure relief valve 40 (cutting out the low pressure relief valve 41), thereby preventing so much of the fluid from by-passing through the main regulating valve 35, and correspondingly building up more pressure in the ducts 30 or 32 and 37, so that the same increase in pressure is built up in ducts 24 and 26 or 27 and applied to the cylinder 17. Thus, the closing under high pressure from the near closed or dotted line position 13 of the platen 12 to its fully closed position and return to position 13, or complete return to its fully open position, depends upon whether the valves 31 or 33, respectively, are closed. Preferably the complete return under high pressure is employed which means that the valve 33 is closed and the valve 31 is open. The reason for this is that the low pressure which is applied to lower the platen 12 pushes upon the whole top surface area of the piston 16 and is just sufficient to lower the platen 12 to its position 13, while this same low pressure, when employed on the other side of the piston 16 which has a smaller area because of that taken up by the piston rod 15, may not be sufficient to lift the weight of the platen 12. In order to prevent damage to the pump 20 and motor 21 when both the valve 33 is closed and the reversing value 25 is in its position 2 as shown in Fig. 1, a maximum pressure limiting by-pass may be provided either in the pump 20 or between ducts 24 and 28.

For example, between the high and low pressure operation of a plastic press, the low pressure applied to the piston 16 may range between 100 and 300 pounds per square inch when the by-pass regulating valve 36 is in the position shown in Fig. 1, and when the solenoid S3 is energized and the low pressure relief valve 41 is cut out of the system, the high pressure applied to the piston 16 may range between 500 and 3300 pounds per square inch. Thus, the low pressure could easily enough be counteracted by any article or matter which would obstruct the movement of the piston and platen 12 toward its position 13 to cause it to delay in its movement sufficiently for the operation of the time controlled safety device described later.

In order to control the time for the operation of the system and solenoids S1, S2 and S3 of the control valves 25 and 36, there may be provided: an upper or open position limit switch TOP, which may be mounted on the frame of the press 10 and operated by an adjustable contactor or cam 50 mounted on an arm 51 connected to the movable platen 12; and one or more lower or near closed and/or fully closed limit switches HIP and/or BOT, which may be mounted also on the frame of press 10 and operated respectively by adjustable contactors or cams 52 and 53 mounted on the same or another lever arm 54 connected to the movable platen 12. Thus according to the system shown in Fig. 1, when the cam or contactor 52 operates limit switch HIP, the solenoid S3 will be operated to apply high pressure to the cylinder 17 during the last part of the down or pressing stroke and the first part of the up or return stroke, or as long as the limit switch HIP is contacted by contactor 52. The other limit switches TOP and BOT are connected to control relays and/or electrical circuits in Fig. 2 described below which in turn control the solenoids S1 and S2.

II. *Electrical controls*

Referring now to the wiring diagram of the electrical circuit in Fig. 2 for controlling the operation of the hydraulic system shown in Fig. 1, there is repeated the power line conductors L2 and L3 shown in the upper left corner of Fig. 1, which conductors are shown extending vertically parallel along substantially the right and left sides of Fig. 2. Between these conductors are connected the relays, solenoids, timers, and safety device of this invention. Starting at the top of Fig. 2, there is provided along the first horizontal conductor between the power conductors L2 and L3, a normally closed stop push button STOP and a normally open start push button START for controlling the whole system. Operation of the button START starts the motor 21 by energization of the relay MR (also shown in Fig. 1) to close its contacts $mr$–1 shown in Fig. 1, and also its holding contacts $mr$–2 bridging the push button START contacts, so that it need only be instantaneously operated. The circuit for the energization of the relay MR is from power conductor L2, through the normally closed switch STOP, switch START and then in parallel therewith holding contacts $mr$–2, now closed emergency contact $e$–3, and relay MR to power conductor L3.

The contact $tp$–1 shown bridging the emergency contact $e$–3 is now open, since the platen 12 of the press 10 is in its top or full line position shown in Fig. 1 for operating the upper limit switch TOP closing another circuit between conductor L2 and L3 through the relay TP in Fig. 2 thereby maintaining its contacts $tp$–1 open. However, as soon as the platen 12 starts to move to close the press, the limit switch TOP is moved into the other position from that shown in Fig. 2, and the relay TP is then de-energized, so that it closes its contacts $tp$–1 removing the by-pass around the emergency contacts $e$–3. Thus when the emergency switch $e$–3 is operated, it will not stop the motor 21 by releasing the relay MR until after the platen 12 has returned to its top or fully open position again to reoperate the limit switch TOP.

Now that the pump 20 is operating and the hydraulic fluid is circulating in the system in Fig. 1 but only through by-pass valve 25, the start of a press operating cycle or the movement of the cylinder 17 is only initiated by pressing the cycle push button CYCLE or its equivalent, shown in the second circuit from the top of Fig. 2. The operation of this normally open push button CYCLE closes a circuit from conductor L2 through the switch CYCLE, now closed cure timer switch $t1$–1, now closed contacts $r2$–3, and relay R1 to conductor L3, thereby energizing the relay R1 which relay closes its holding contact $r1$–1 bridging the switch CYCLE. Relay R1 also closes its two other contacts $r1$–2 to energize the "down" solenoid S1, and contacts $r1$–3 to start the safety device timer ST. The energization of the solenoid S1 operates the reversing valve 25 in Fig. 1 to move its portion or box 1 into the position of box 2 and directly connect the cylinder 17 to the pump 20 to apply pressure through duct 26 to the top of the piston 16 and move it and the platen 12 downwardly and away from its full line position shown toward its position 13 to start the closing of the press 10. Simultaneously, the safety device timer ST is also started to gauge the time it takes the platen 12 to travel to its closed or near closed position. The circuit for starting the timer ST is from conductor L2, through the now closed lower limit switch BOT, now closed contact $r1$–3, and the timer ST to conductor L3. However, since some systems do not employ both limit switches HIP and BOT, either one of these limit switches may be used in the control of this safety timer circuit ST. Accordingly, when the contactor 53 is removed from the press 10, the switch BOT in Fig. 2 may be connected, such as via an element 55, with the switch HIP which is still operated by the movement of the platen 12.

The timer circuit ST may be an electronic timer circuit similar to that shown in the dotted rectangle in Fig. 2, and may comprise an electron discharge tube 57 connected to a variable resistance-condenser time-constant circuit RC–2. This timer circuit is so constructed, that upon its disconnection or release from a circuit, it will immediately reset its timing circuit to be ready for the next operation to be timed. However, other types of timer circuits may be employed, if desired. The setting of this safety timer circuit should correspond to slightly longer than the normal unobstructed time for the piston 16 and platen 12 to travel from its upper position shown in Fig. 1 to its dotted line position 13, such as until after the operation of the limit switch BOT as shown in Fig. 2 which occurs right after or together with the operation of limit switch HIP.

If the press 10 is automatically and continuously operated such as with automatic feeder for the mold 11, then the cycle button CYCLE may be bridged or replaced by the dotted line circuit with the contact switch X shown therein, which switch X automatically closes each time a press operating cycle is completed and it has been re-loaded with another charge of material 14. The full line push button CYCLE is shown for manual operation of each cycle independently.

II–A. Unobstructed operation

Assuming first that there is no obstruction to delay the movement of the platen 12 from its full line position shown in Fig. 1 to its dotted line position 13, and then on to the full closing of the press and operation of the bottom limit switch BOT before the safety timer circuit ST has energized its relay T2, then the near closed position limit switch HIP is closed to energize the solenoid S3 which operates the by-pass regulating valve 36 in Fig. 1. The operation of solenoid S3 moves box 2′ of the valve 36 into the position of box 1′ and cuts off the low pressure relief valve 41, so that now less fluid is by-passed through the by-pass valve 35 and a greater pressure of fluid is applied to the ducts 24 and 26 and the top of the piston 16 to apply a greater pressure on the material 14 in the mold 11 by the platen 12.

In the case of the plastic press shown herein, the material 14 is first quickly compressed under the higher pressure to move the platen 12 downwardly a small distance more to operate the bottom limit switch BOT. This bottom limit switch BOT will then open the closed contacts shown in Fig. 2 and close the contacts to the cure timer circuit CT, which timer may be similar to the timer circuit ST shown above it, but which circuit CT is set for the time necessary for completely polymerizing or curing the plastic material 14 into a final product under the pressure, and possibly also heat, which may be added to the molds 11 and/or 12.

After this curing time has expired, the cure timer circuit CT energizes its relay T1 which opens its contacts t1–1 to de-energize the relay R1, and to close its contacts t1–2 to energize the relay R2. The de-energization of the relay R1: opens its holding contacts r1–1; opens its contacts r1–2 which de-energizes the solenoid S1 so that the valve 25 returns to the position shown in Fig. 1 shutting off both pressure ducts 24 and 28 to and from the cylinder 17; and opens its contacts r1–3 in the safety timer circuit ST, but which have no effect in that the bottom limit switch BOT has already been operated to cut out the safety timer circuit ST.

The energization of the relay R2 is from conductor L2 through now changed top limit switch TOP, now closed timer contact t1–2, and relay R2 to conductor L3. Relay R2 now closes its holding contacts r2–1 bridging contact t1–2; closes its contacts r2–2 to energize the "up" solenoid S2 which moves the position of box 3 at the valve 25 into the position of box 2 reversing the flow of the pressure into the cylinder 17 so that pressure is applied from ducts 24 and 27 to raise the piston 16 and platen 12, and to discharge the fluid above the piston 16 through ducts 27, 28 and 29 back into the reservoir 22; and opens contacts r2–3 in the circuit of relay R1 but which have no effect thereon in that this circuit has already been opened by the cure timer contacts t1–1.

The upward movement of the platen 12 again operates the lower or closed press limit switches BOT and HIP to return them to their positions shown in Fig. 2, and to disconnect the cure timer CT so it can immediately reset itself for the next cycle operation. The relay R2 remains energized until the platen 12 reaches its fully open position where it operates the upper limit switch TOP into its position shown in Fig. 2, breaking the circuit to the relay R2 and energizing again the relay TP. Thus, a normal cycle of operation of the press is completed.

II–B. Obstructed operation

Assuming now, that there is an obstruction which delays the descent of the platen 12 during the next cycle of operation, from reaching the lower or bottom position and operation of the lower limit switches HIP and/or BOT before the safety timer ST energizes its relay T2. In this case, the relay T2 closes its contacts t2–1 shown in the lower left corner of Fig. 2, which contacts t2–1 closes a circuit from conductor L2 through the push button STOP, conductor 56, now closed contacts t2–1, and emergency relay E to conductor L3, to energize relay E.

This emergency relay E now closes its holding contacts e–1 bridging contacts t2–1; closes its contacts e–2 energize relay R2 to reverse the motion of the piston 16; and opens its contact e–3 in the main start-stop circuit in preparation to the stopping of the motor 21 when the platen 12 has returned to its fully opened position and operates the upper limit switch TOP as shown in Figs. 1 and 2 to energize the relay TP opening its contacts tp–1 bridging the now open contact e–3. The closing of the contacts e–2 first energizes through the still open limit switch TOP, the relay R2 which operates as described previously. Its contacts r2–3 now open to break the circuit to relay R1 which was energized to operate the "down" solenoid S1 for moving the platen down. This de-energization of solenoid S1 permits the valve 25 to shut off and return to the position shown in Fig. 1, before it is reversed by the simultaneous energization of the "up" solenoid S2 by closing contacts r2–2, which solenoid S2 now reverses the movement of the piston 16 to open the press and return the platen 12 to its fully open position regardless of how far down it has moved at the time the timer ST energized its relay T2.

As soon as the platen 12 returns to its fully open position and operates the upper limit switch TOP, the circuit is broken to de-energize the relay R2, which in turn opens its contacts r2–2 to de-energize the solenoid S2 and return the reversing valve 25 into its off and full line position shown in Fig. 2, as well as to energize the relay TP opening the circuit to relay MR, since both the contacts e–3 and tp–1 are now open. This stops the motor 21 which cannot be started again until the push button STOP is operated, since switch STOP must be operated to break the circuit to the emergency relay E, to permit contacts e–3 to close.

Simultaneously, with the energization of the emergency relay E, there may be connected in parallel therewith a signal light SL (or any other type of signal) which may be located on a control panel or on the press itself, as desired to indicate to an operator that an obstruction or faulty operation of that press has occurred, and that the press should be examined and the obstruction removed before re-starting the press.

While there is described above the principles of this invention in connection with specific apparatus, it is to be clearly understood that this description is made only by way of example and not as a limitation to the scope of this invention.

What is claimed is:

1. A safety device for a machine having a part movable during a predetermined time interval between an open position and another position and power means for moving said part between said positions, said safety device comprising: a limit switch at each of said positions operated by said movable part, and a timer governed by the operation of said limit switches by said movable part and operatively connected to said power means to cause said power means for moving said part to reverse its movement between said positions when said part is retarded in its normal movement between said positions.

2. A safety device according to claim 1 wherein said means for moving said part comprises a hydraulic system including a reversing valve and means controlled by said timer for operating said valve.

3. A safety device according to claim 1 wherein said timer is an electronic circuit comprising a variable resistor-condenser delay circuit and an electron discharge tube.

4. A safety device according to claim 1 including signalling means operated when said part is reversed in its movement under the control of said timer.

5. A safety device according to claim 1 including an electrically controlled circuit for said means for moving said part comprising an emergency relay operated by said timer.

6. A safety device according to claim 5 wherein said emergency relay and said limit switch in said open position for said part operate means for stopping said means for moving said part.

7. A safety device according to claim 5 including manual means for de-energizing said emergency relay before said means for moving said part can be operated.

8. A safety device according to claim 1 wherein one of said limit switches is located near the closed position of said movable part.

9. A safety device according to claim 8 including an additional limit switch at the completely closed position for said movable part.

10. A safety device according to claim 9 wherein said machine includes a second timer operated by said additional limit switch for controlling the time the movable part remains in its closed position before moving back to its open position.

11. A safety device for an automatic hydraulic plastic press having a platen moving between an open position and a near closed position, and a hydraulic piston and system for moving said platen between said positions including a reversing valve in said system, said safety device comprising: a limit switch at each of said positions operated by said platen, and an electronic timer controlled with said limit switches to operate the reversing valve in said hydraulic system to reverse the closing movement of said platen between said positions when said platen is delayed in contacting said near closed position limit switch after leaving its fully open position.

12. A safety device according to claim 11 wherein said hydraulic system includes a by-pass regulating valve controlled by said near closed position limit switch, whereby increased pressure is applied to said hydraulic piston between said near closed position and its fully closed position than that pressure applied when moving between said open position and said near closed position.

13. A safety device for a press having a movable die and a power means for moving said die along a path, said safety device comprising: a pair of limit switches operated by the movement of said die when the die of said press is open and when it is near closing, means for controlling said power means for moving said die between said limit switches, a timer means initiated by the initiation of the movement of said die from its open position to measure the unobstructed time for movement of said die between said limit switches, and means controlled by said timer to cause said means for controlling said power means to reverse the movement of said die when the time required for the movement of said die between said limit switches has exceeded a pre-determined time.

14. A safety device for use with a machine including a member movable at a predetermined speed between a first and a second position and further including power means for reciprocating said member between said positions, said safety device including a timer, means actuated by said member when leaving the first position and operatively connected to the timer to activate said timer, control means activated by said timer and operatively connected to said power means for reversing movement of said member when said predetermined time interval has been exceeded, and means operable by movement of said member to said second position during said predetermined time interval for deactivating said timer.

15. A safety device for use with a press including a piston movable during a predetermined time interval between an open position and another position spaced therefrom and further including means for reciprocating said piston between said positions, said safety device comprising a first limit detector operable by the piston when leaving said first position, a second limit detector operable by the piston when moved to said other position, a timer operably connected to said first limit detector and activated by said piston leaving the open position, control means activated by said timer after a predetermined time interval and operably connected to said power means for reversing movement of said piston, and means operably connected to said timer and said second limited detector for deactivating said timer upon operation of said second limit detector by movement of said piston.

16. An electrical curing and safety timer circuit for use with a plastic press including a piston movable at a predetermined speed between an open and a closed position and further including means for reciprocating said piston between said positions, said circuit comprising: a first limit switch operable by said piston in the open position, a second limit switch operable by the piston in the closed position, an intermediate limit switch between said first and second limit switches and operable by the piston in moving from the open to the closed position, a timer activated by said first limit switch and operatively connected to said reciprocating means for causing the piston to be reversed if retarded in its normal movement, means operatively connecting said intermediate limit switch to said timer to deactivate said timer when said intermediate limit switch is operated by said piston, and a curing timer activated by said second limit switch and movement of the piston to the closed position for controlling the time said piston remains in the closed position.

References Cited in the file of this patent

UNITED STATES PATENTS

| | | |
|---|---|---|
| 2,423,914 | Wacker | July 15, 1947 |
| 2,444,339 | Dinzl | June 29, 1948 |
| 2,801,442 | Moslo | Aug. 6, 1957 |
| 2,805,447 | Voges | Sept. 10, 1957 |